(12) United States Patent
Bender

(10) Patent No.: US 6,891,812 B2
(45) Date of Patent: May 10, 2005

(54) METHOD AND APPARATUS FOR DATA RATE CONTROL IN A COMMUNICATION SYSTEM

(75) Inventor: Paul E. Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 412 days.

(21) Appl. No.: 09/804,655

(22) Filed: Mar. 12, 2001

(65) Prior Publication Data

US 2002/0126641 A1 Sep. 12, 2002

(51) Int. Cl.[7] .................................................. H04Q 7/00
(52) U.S. Cl. ..................................... 370/328; 370/468
(58) Field of Search ............................... 370/335, 342, 370/468, 328, 338, 465, 337, 254; 455/573

(56) References Cited

U.S. PATENT DOCUMENTS

| | | | | |
|---|---|---|---|---|
| 5,790,534 A | * | 8/1998 | Kokko et al. ............... | 370/352 |
| 5,857,147 A | * | 1/1999 | Gardner et al. ............. | 370/236 |
| 5,870,685 A | * | 2/1999 | Flynn ......................... | 455/573 |
| 6,195,345 B1 | * | 2/2001 | Kramer ....................... | 370/352 |
| 6,205,129 B1 | * | 3/2001 | Esteves et al. .............. | 370/342 |
| 6,229,795 B1 | * | 5/2001 | Pankaj et al. ............... | 370/329 |
| 6,377,814 B1 | * | 4/2002 | Bender ....................... | 370/311 |
| 2002/0105974 A1 | * | 8/2002 | Cheng et al. .............. | 370/342 |

FOREIGN PATENT DOCUMENTS

| | | |
|---|---|---|
| EP | 0831669 | 3/1998 |
| WO | 9923844 | 5/1999 |
| WO | 0041542 | 7/2000 |

* cited by examiner

Primary Examiner—Chi Pham
Assistant Examiner—Keith M. George
(74) Attorney, Agent, or Firm—Phil R. Wadsworth; Sandra L. Godsey

(57) ABSTRACT

In a wireless communication system (10) a method and apparatus for inhibiting data transmissions during a data service outage at the access terminal (16). The access terminal (16) transmits an outage indicator to the access network (12) prior to the outage. A data service outage may be due to a page monitor of the voice portion of the system, or to frequency searching during which the access terminal (AT) is not available to receive data. The access network (12) does not transmit data during the outage. In one embodiment, the indicator is a DRC null cover. In an alternate embodiment, the indicator is a DRC having a zero data rate.

20 Claims, 7 Drawing Sheets

AT

AT

AN

US 6,891,812 B2

METHOD AND APPARATUS FOR DATA RATE CONTROL IN A COMMUNICATION SYSTEM

BACKGROUND

1. Field

The present invention pertains generally to communications, and more specifically to a method and apparatus for data rate control in a communication system.

2. Background

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification."

HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and accurate method of transmitting information in a communication system that optimizes use of available bandwidth.

SUMMARY

According to one aspect, a wireless apparatus operative in a wireless data communication system includes a processor and a memory. The memory is coupled to the processor. The processor is operative for a plurality of computer readable instructions. The instructions include a first set of computer readable instructions operative to determine if sufficient time slots are available to transmit a data packet prior to an outage, and a second set of computer readable instructions operative to generate an outage indicator to inhibit transmission of the data packet as sufficient time slots may not be available to receive the data packet.

According to another aspect, in a wireless communication system capable of data communications, a method determines a data service outage, and transmits a data outage indicator to inhibit data transmissions during an outage.

DETAILED DESCRIPTION

Figure 1:
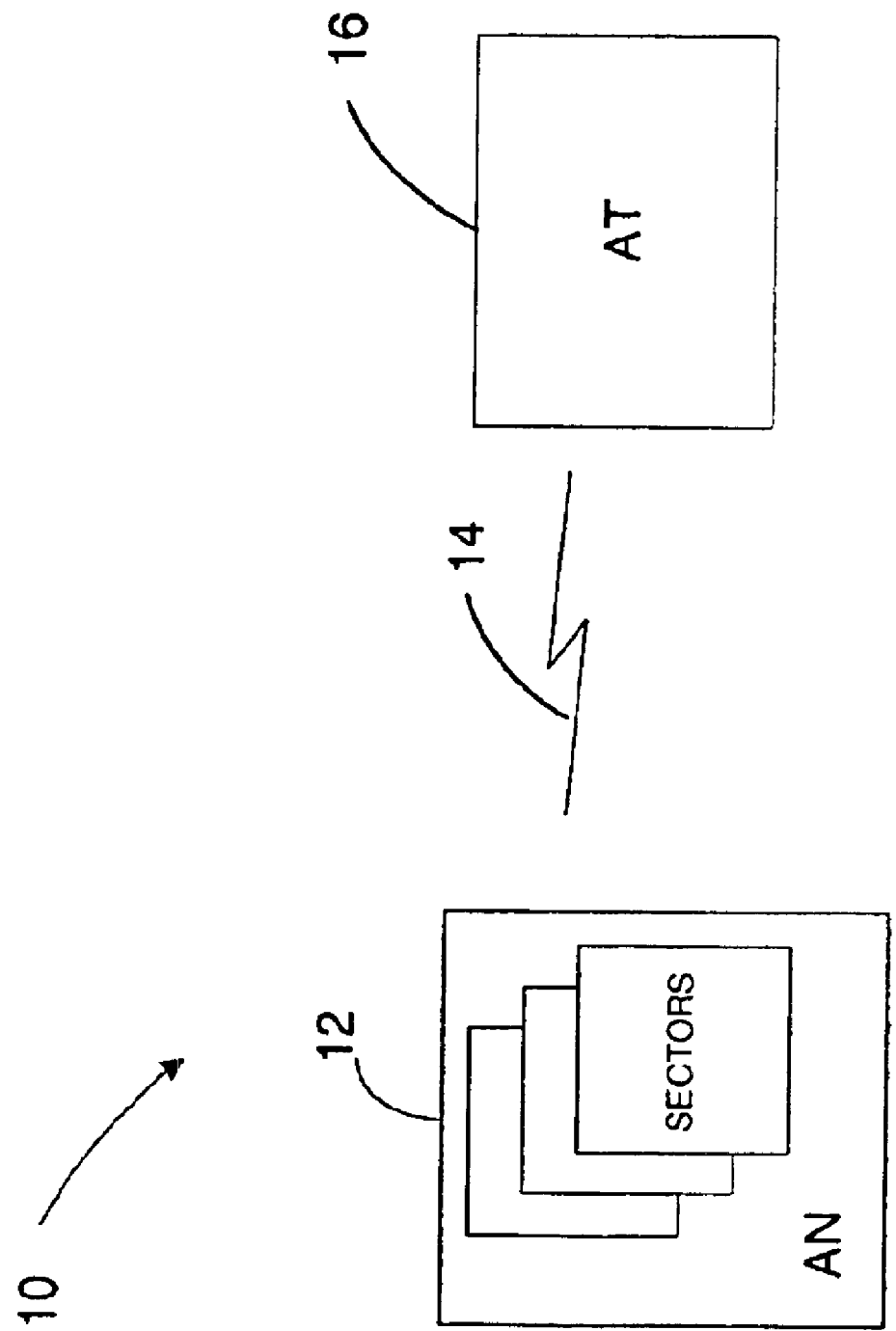
FIG. 1 is a communication system configured according to one embodiment.

FIG. 1 illustrates an architecture reference model for a communication system 10 having an Access Network (AN) 12 communicating with an Access Terminal (AT) 16 via an air interface 14. In one embodiment, the system 10 is a Code Division Multiple Access (CDMA) system having a High Data Rate (HDR) overlay system, such as specified in the "TIA/EIA/IS-856 cdma2000 High Rate Packet Data Air Interface Specification" referred to as "the HDR standard." The AN 12 communicates with AT 16, as well as any other ATs within system 10 (not shown), by way of the air interface 14. The AN 12 includes multiple sectors, wherein each sector provides at least one Channel. A Channel is defined as the set of communication links for transmissions between the AN 12 and the ATs within a given frequency assignment. A Channel consists of a Forward Link (FL) for transmissions from the AN 12 to AT 16 and a Reverse Link (RL) for transmissions from the AT 16 to the AN 12.

Figure 3:
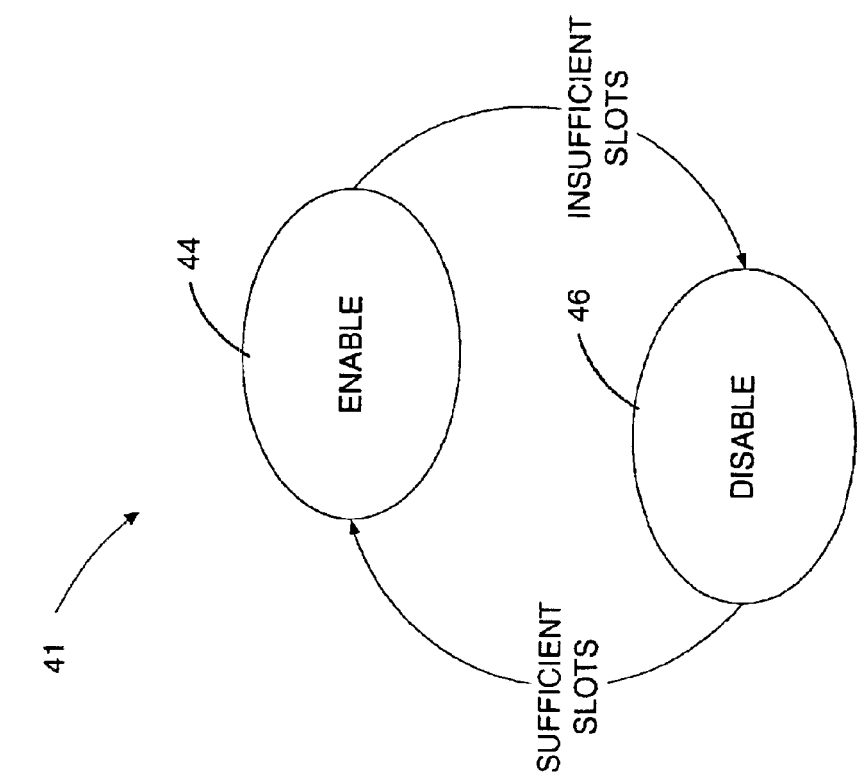
FIG. 3 is a state diagram of operation of an access terminal in a communication system as in FIG. 1 according to one embodiment.
Figure 2:
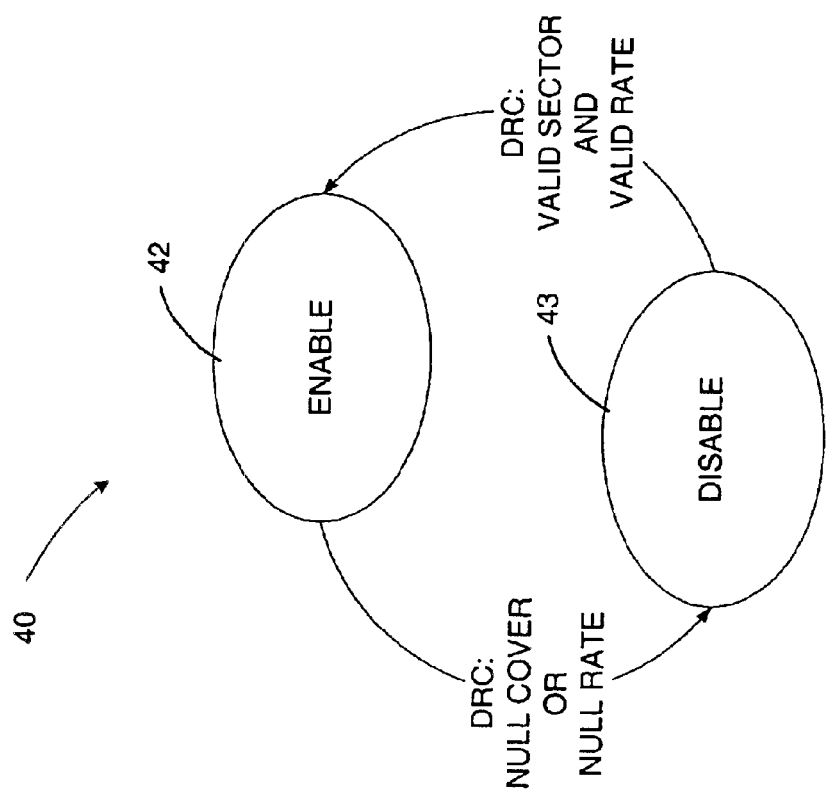
FIG. 2 is a state diagram of operation of an access network in a communication system as in FIG. 1 according to one embodiment.

FIGS. 2 and 3 illustrate HDR operation of AN 12 and AT 16, respectively. The AN 12 and AT 16 each include a processor and at least one memory storage device in addition to signal processing modules. The processor may be a central processing unit or may be a dedicated controller. The memory storage device stores computer-readable instructions and/or routines for controlling communication within the wireless system 10. Within AN 12, the memory storage device may store instructions to control data transmissions. Within AT 16, the memory storage device may store instructions controlling data transmissions, including data requests.

FIG. 2 illustrates a state diagram 40 for the data transmission states of AN 12 with respect to AT 16, i.e., HDR states. Generally, the state of AN 12 refers to the state of a protocol engine in the AN 12 as it applies to a particular AT, such as AT 16. Since the AN 12 communicates with multiple ATs, multiple independent instantiations of a protocol will exist in the AN 12, each with its own independent state machine. The state diagram 40 includes two states: ENABLE and DISABLE, wherein each state references a data transmission to AN 12. In the ENABLE state 42, AN 12 is configured to receive requests for data transmissions from the AT 16 and to transmit any pending data transmissions to AT 16. In the DISABLE state 43, AN 12 discontinues transmission of pending data transmissions to AT 16.

For data transmissions, the AN 12 receives a data request from the AT 16. The data request specifies the data rate at which the data is to be sent, the length of the data packet transmitted, and the sector from which the data is to be sent. The AT 16 determines the data rate based on the quality of the Channel between AN 12 and AT 16. In one embodiment the quality of the Channel is determined by the Carrier-to-Interference ratio, C/I. Alternate embodiments may use other metrics corresponding to the quality of the Channel. The AT 16 provides requests for data transmissions by sending a Data Rate Control, DRC, message via a specific channel referred to as the DRC channel. The DRC message includes a data rate portion and a sector portion. The data rate portion indicates the requested data rate for the AN 12 to send the data, and the sector indicates the sector from which the AN 12 is to send the data. Both data rate and sector information are required to process a data transmission. The data rate portion is referred to as a DRC value, and the sector portion is referred to as a DRC cover. The DRC value is a message sent to the AN 12 via the air interface 14. In one embodiment, each DRC value corresponds to a data rate in kbits/sec having an associated packet length according to a predetermined DRC value assignment. The assignment includes a DRC value specifying a null data rate. In practice, the null data rate indicates to the AN 12 that the AT 16 is not able to receive data. In one situation, for example, the quality of the Channel is insufficient for the AT 16 to receive data accurately.

In operation, the AT 16 continuously monitors the quality of the Channel to calculate a data rate at which the AT 16 is able to receive a next data packet transmission. The AT 16 then generates a corresponding DRC value; the DRC value is transmitted to the AN 12 to request a data transmission. Note that typically data transmissions are partitioned into packets. The time required to transmit a packet of data is a function of the data rate applied.

In one embodiment, the AT 16 covers the DRC value with a DRC cover. The DRC cover is a coding applied to identify the sector from which the data is to be transmitted. In one embodiment, the DRC cover is a Walsh code applied to the DRC value, wherein a unique code corresponds to each sector in the Active Set of the AT 16. The Active Set, AS, consists of those sectors, with which AT 16 is currently transmitting and receiving information. According to this embodiment, at least one Walsh code is designated as a null cover that does not correspond to any sector in the AS. The DRC value and DRC cover provide the complete data request, as the DRC value specifies a data rate and the DRC cover identifies a transmission sector. Alternate embodiments may use alternate covers or methods of identifying a transmission sector. Still other embodiments may include the sector identification in the DRC value.

Continuing with FIG. 2, the AN 12 transitions from the ENABLE state 42 to the DISABLE state 43 on receipt of a DRC value corresponding to a null data rate or on receipt of a DRC value having a null cover. On transition to the DISABLE state 43, the AN 12 does not process any pending data transmissions to AT 16. From the DISABLE state 43, the AN 12 transitions to the ENABLE state 42 on receipt of a DRC value specifying a data rate other than the null rate, i.e., a valid non-null data rate. Similarly, the AN 12 transitions to the ENABLE state 42 on receipt of a DRC value having a DRC cover specifying a valid sector, i.e., a sector in the Active Set of AT 16. In the ENABLE state 42, AN 12 processes pending data transmission to AT 16. Specifically, AN 12 processes the next data transmission according to the data rate specified in the DRC value and from the sector specified by the DRC cover.

FIG. 3 illustrates a state diagram 41 for operation of AT 16, indicating transitions between ENABLE state 44 and DISABLE state 46. In the ENABLE state 44, AT 16 requests data from AN 12 and processes data transmissions from AN 12. In the DISABLE state 46, AT 16 does not request data from AN 12. The AT 16 enters the DISABLE state 46 when there are insufficient time slots available for a given data transmission or message. Determination of the number of time slots available, i.e. amount of time allowed for a data transmission, is a function of several conditions, including DRC start time, DRC length, the DRC value specifying the transmission, and the turnaround time. The time available for the AT 16 to receive a data transmission is measured from the DRC start time and continues through the length of the DRC and the turnaround time. For example, with reference to FIG. 5, the DRC start time is at time $t_0$.

Figure 5:
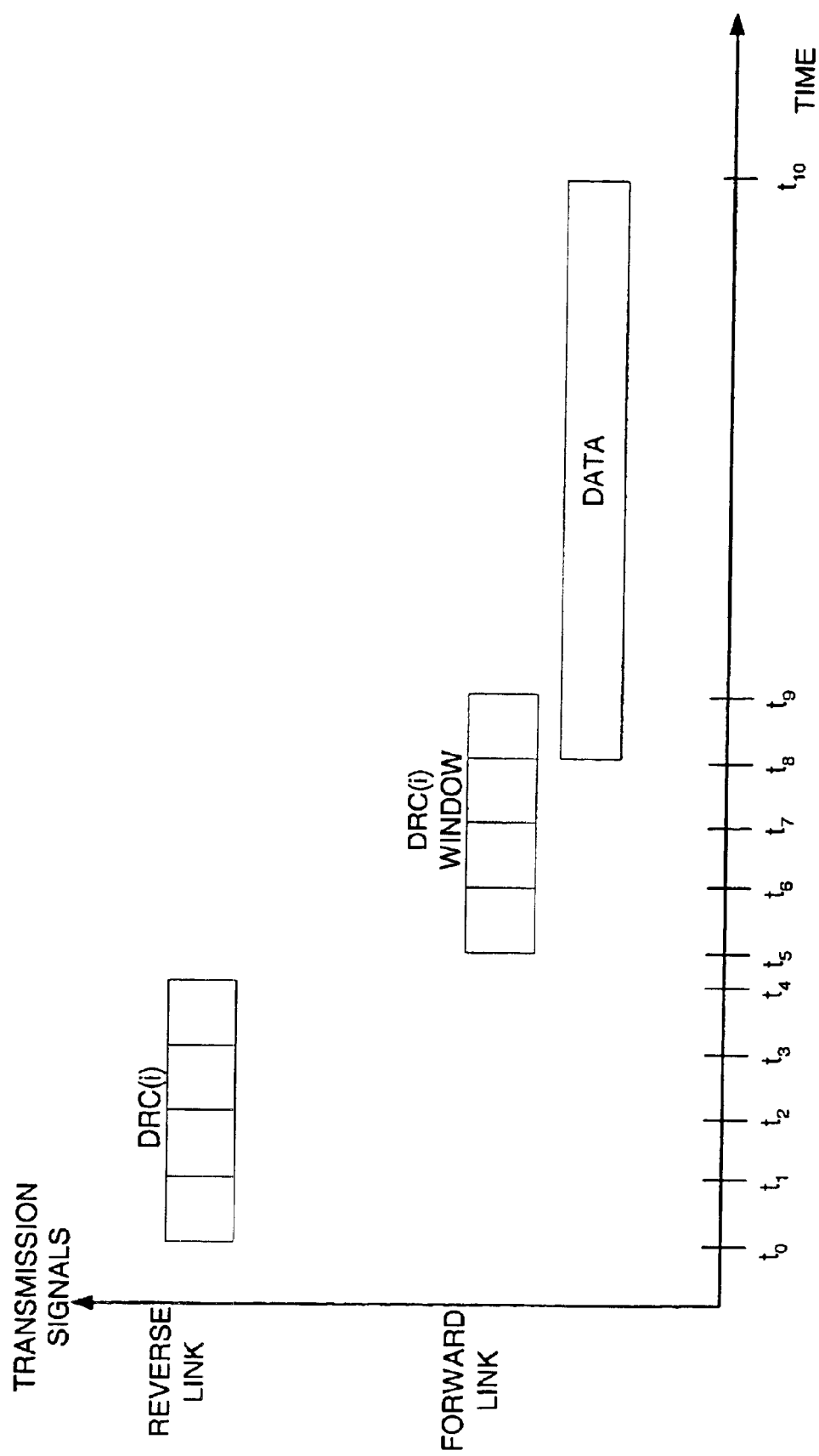
FIG. 5 is a timing illustration of data rate control generation and a corresponding data transmission in a communication system as in FIG. 1 according to one embodiment.

As illustrated in FIG. 5, the time available for AT 16 to receive a data transmission is any time prior to time $t_{10}$, and effectively is measured from time $t_0$ to time $t_{10}$. As illustrated, the DRC may have a length over multiple time slots. In this case the DRC(i) is made up of four time slots, wherein the DRC length is measured from time $t_0$ to $t_4$, including four time slots: $t_0$ to $t_1$; $t_1$ to $t_2$; $t_2$ to $t_3$; and $t_3$ to $t_4$. The turnaround time is from time $t_4$ to $t_5$. After the turnaround time, four time slots are available during which the data transmission may start. As the DRC window length is equal to the DRC length, the DRC window, therefore, includes the same number of time slots as the transmitted DRC. In other words, the DRC length is equal to the DRC window length. Specifically, as illustrated in FIG. 5, the length of DRC(i) is equal to the length of DRC(i) WINDOW. In addition to the DRC start time, the DRC length and the turnaround time, the time available is calculated based on the latest time possible for a transmission to complete. As the data transmission may begin during any of the four time slots of the DRC(i) WINDOW, the latest possible transmission completion would start at time $t_8$ and complete at time $t_{10}$. Therefore, the latest possible transmission is used for the calculation of the time available. Note that it is possible to have a transmission processed from each of the time slots of the DRC window, where in this case there are a total of four possible transmissions. However, none of the four transmissions would complete later than the one starting at time $t_8$.

Returning to FIG. 3, in effect, in the DISABLE state 46 the AT 16 does not request any further HDR transmissions. The AT 16 transitions to the DISABLE state to "tune away" to another frequency; and therefore, the data transmission frequency is not available for reception. The AT 16 may currently be processing data requested prior to transition to DISABLE state. Similarly, AT 16 may have stored such received data in a memory device for later processing. It is further possible that some data is stored for later processing and other data is being processed. While AT 16 does not request data transmissions while in the DISABLE state 46, the AT 16 may continue to process data received prior to a transition to the DISABLE state 46 and may receive messages within the time available. In this way, if any pending message may complete transmission prior to the time when AT 16 will tune away, that message may be transmitted from AN 12 and received by AT 16. In one embodiment, the AT 16 may process voice transmissions while in the DISABLE state 46.

Multi-carrier wireless communication systems, such as systems supporting voice and data, incorporate different carrier frequencies for different services and/or sectors. For example, in one embodiment, a wireless HDR system incorporates different frequencies per sector. Other systems include a service that use different carrier frequencies, such as Short Message Service, SMS, facsimile service, etc. In multi-carrier systems it may be necessary for an AT to search for a different frequency, either periodically or one occurrence of an event. Anytime an AT searches for a different frequency, the AT tunes away. In an HDR system the AT may tune away to search for other sectors.

In operation, the AT 16 determines a data rate based on the quality of the channel. Based on the data rate, the AT 16 is able to calculate the time required to transmit the next data packet. The time is measured as time slots, where each slot is a predetermined duration of time. In HDR systems, the AT 16 may receive both voice and data communications. To affect this capability, the AT 16 switches between the data and voice portions of the system. While the AT 16 switches to the voice portion of the system, the data portion has a temporary outage within the AT 16. Specifically, the AT 16 periodically monitors a paging channel for requests for voice communications.

In addition to processing the data transmissions from AN 12, the AT 16 also processes voice transmissions. The voice transmissions may be received from AN 12 or from another AN within system 10. To process voice transmissions, the AT 16 periodically checks for voice system pages indicating a voice call is pending. Note that a voice system may include other services, such as SMS and may also perform an inter-frequency search. The HDR and voice transmissions are each processed on different frequencies. To check for pages, the AT 16 monitors a specific frequency different from the HDR frequency. The check for pages results in an effective outage on the HDR frequency. To avoid missing any data packets that may be sent during an outage, the AT 16 determines when each outage is scheduled. If a given data transmission is able to complete before a scheduled outage, the AT 16 sends a request in the form of a DRC having a valid data rate and a valid sector to AN 12. In other words, AT 16 compares the number of time slots N needed to transmit and receive the given data transmission or data packet to the number of time slots M before the scheduled outage. If N is less than or equal to M, the data transmission may proceed. If there is insufficient time to process the data transmission before the scheduled outage, i.e., N is greater than M, AT 16 provides a message instructing AN 12 not to transmit the next data transmission. In one embodiment, this message is a DRC having either a null data rate or a null cover.

As illustrated in FIG. 3, AT 16 transitions from the ENABLE state 44 to the DISABLE state 46 on determination that insufficient slots are available for the next data transmission. In the DISABLE state 46, the AT 16 discontinues requesting data transmissions from AN 12. The AT 16 transitions from the DISABLE state 46 to the ENABLE state 44 on determination that sufficient slots are available for the next data transmission. In the ENABLE state 44, the AT 16 sends a DRC having a valid data rate and sector to the AN 12 and processes data transmissions received from AN 12.

Figure 4:
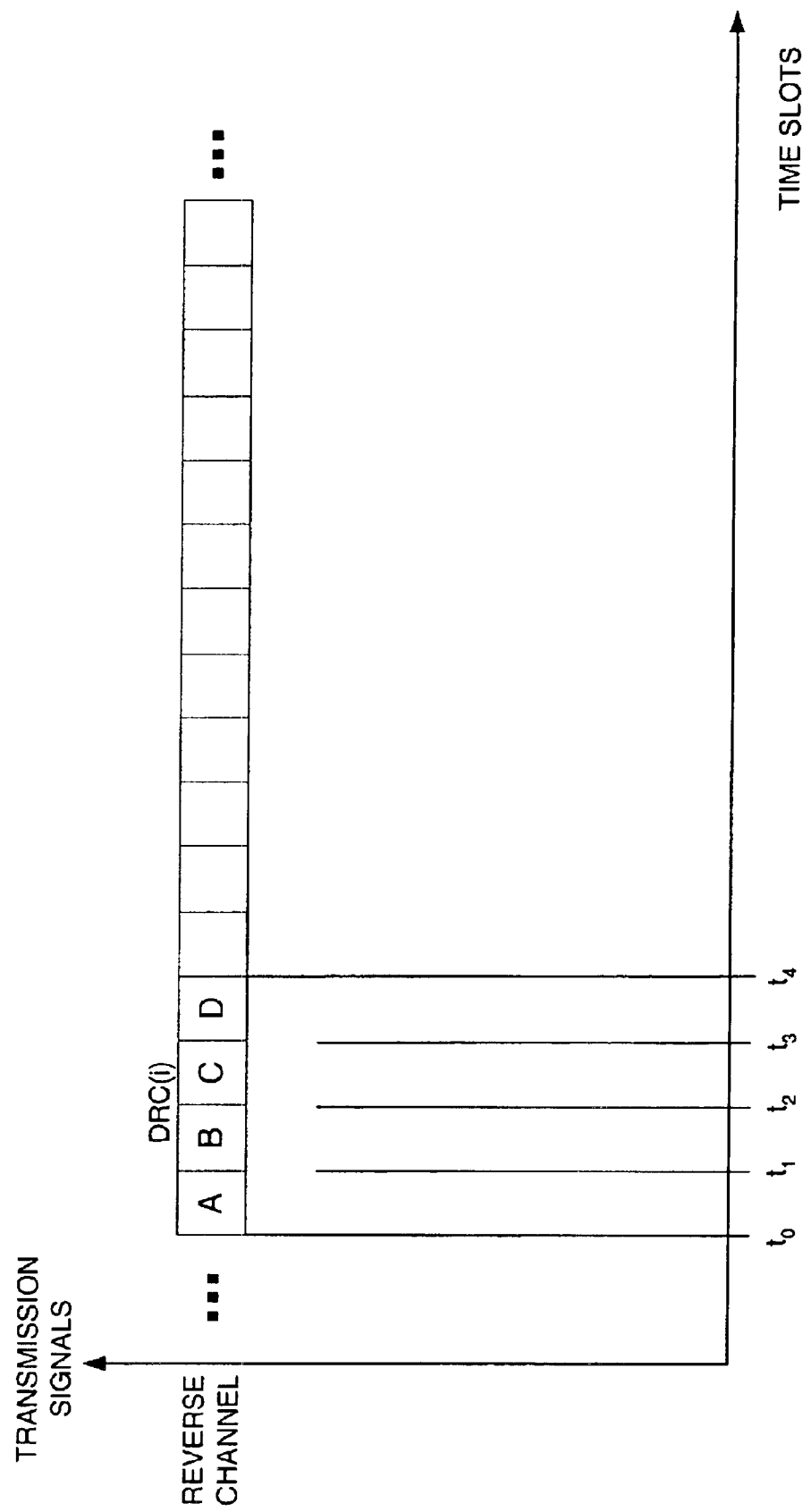
FIG. 4 is a timing illustration of data rate control timing in a communication system as in FIG. 1 according to one embodiment.

In one embodiment, illustrated in FIG. 4, the DRC is provided over multiple slots. The slots are labeled A, B, C and D, and begin at times $t_0$, $t_1$, $t_2$, $t_3$, respectively. The DRC value may use multiple slots, and may incorporate repetitive coding techniques. The AT 16 transmits the DRC information within the specified slots on the RL. The DRC values are determined and generated continuously by AT 16.

The AN 12 receives the DRC information and prepares to send the data at the specified data rate and in the specified sector after a predetermined turn-around time. As illustrated in FIG. 5, a DRC window begins at time $t_5$ after the turn-around time. In one embodiment, the turn-around time is a half time slot. The data transmissions specified by DRC(i) may begin any time within the DRC(i) window, i.e., $t_5$ to $t_8$.

Figure 6:
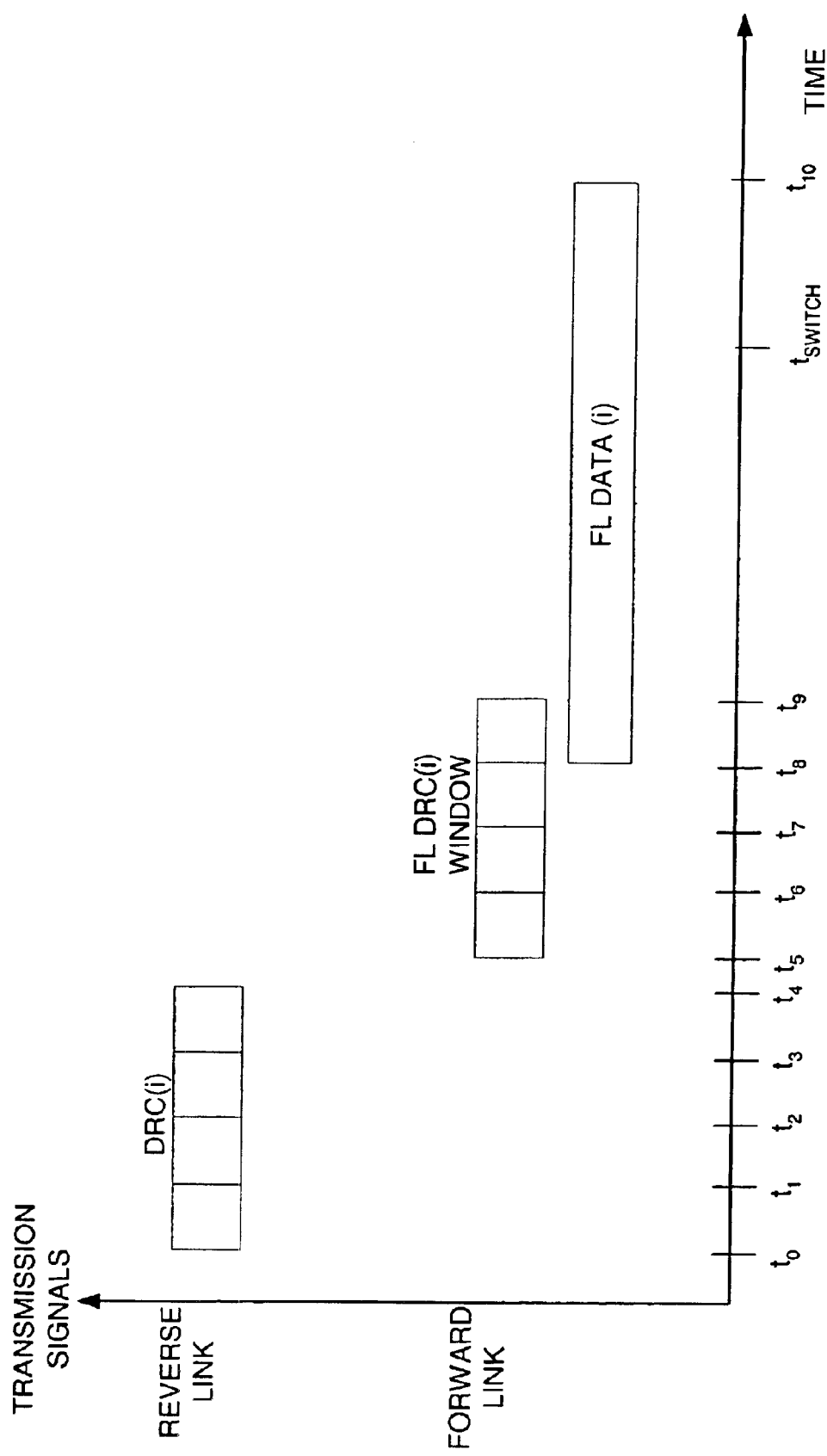
FIGS. 6–7 are alternate timing illustrations of data rate control generation and corresponding data transmissions in a communication system as in FIG. 1 according to one embodiment.

FIG. 6 illustrates a first scenario having insufficient time slots available for processing a next data transmission. To avoid missing any data packets sent during an outage, the AT 16 determines when the next outage is scheduled. Processing a given data transmission requires time slots from $t_8$ to $t_{10}$. However, the AT 16 has an outage scheduled at the time marked $t_{SWITCH}$, prior to time $t_{10}$. Since insufficient time slots are available for receipt of the next data transmission, AT 16 provides an indication to AN 12 that no data should be sent during an upcoming outage. In one embodiment, the indication is to provide a null cover for the DRC. Effectively the null cover provides a data rate request without specifying a sector. The AN 12 receives the null cover and has insufficient information to provide the data, so no data is sent during that time period. In an alternate embodiment, the indication is a zero rate request. Again the AN 12 has insufficient information to provide the data and, therefore, forgoes the transmission for this time period.

Figure 7:
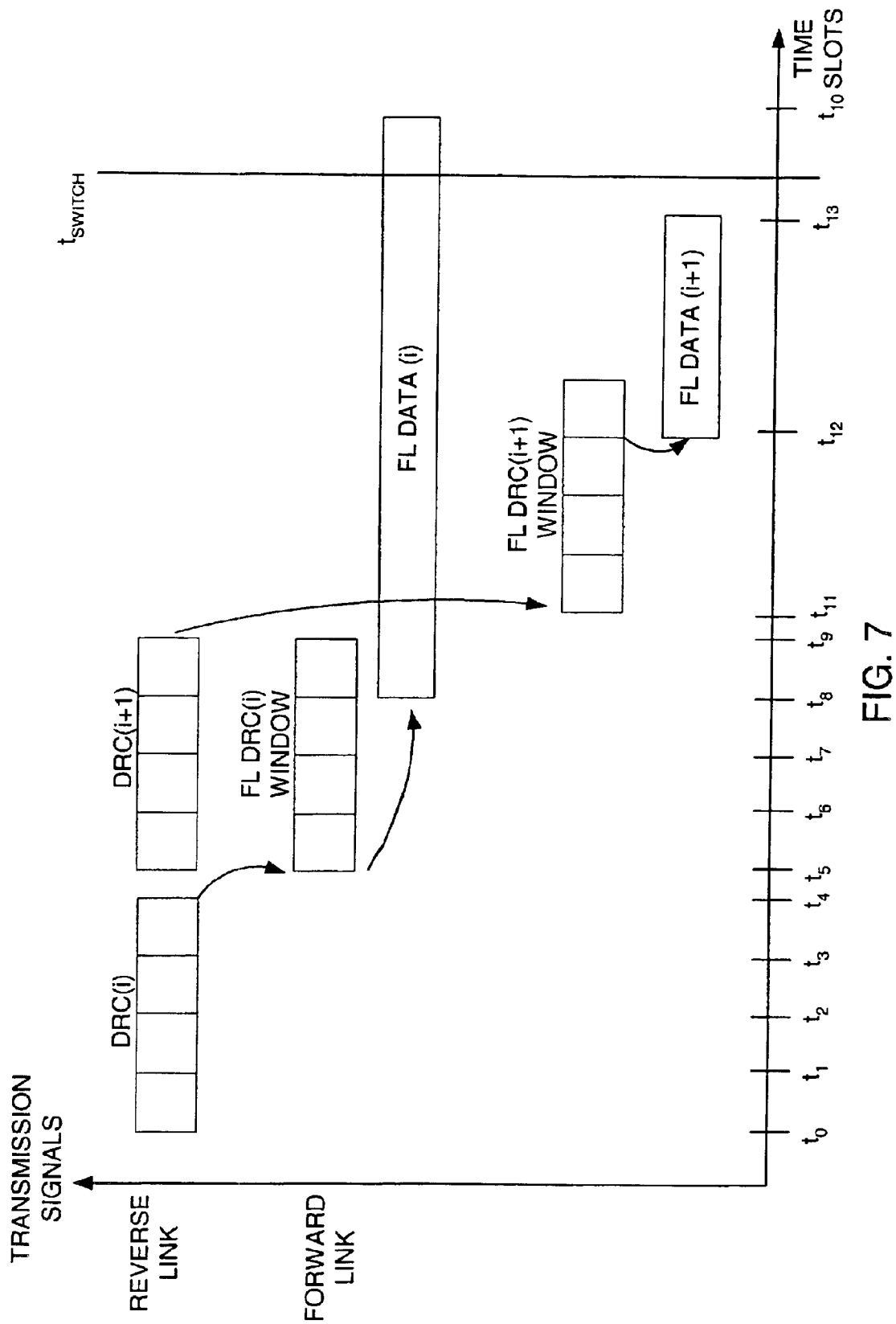

FIG. 7 illustrates a second scenario, wherein the data transmission specified by DRC(i) does not have sufficient time slots to be received by AT 16. The data transmission would complete at time $t_{10}$, which is after $t_{SWITCH}$. The AT 16 continues generating DRC messages by determining data rates as a function of the channel. The next calculation results in a DRC(i+1) having a data rate higher than the data rate of DRC(i). According to this new calculated data rate, the data transmission specified by DRC(i+1) has sufficient time slots to be received by AT 16, i.e., time slots $t_{12}$ to $t_{13}$. In this case, the AT 16 transmits DRC(i) with a null data rate or a null cover and no data transmission begins from AN 12 during the DRC(i) window, i.e., $t_5$ to $t_8$. However, the AT 16 transmits DRC(i+1) with a valid data rate and valid sector. In response AN 12 may transmit data as specified by DRC(i+1). In this case, the Channel condition changed sufficiently to increase the data rate available and reduce the transmission time needed for AT 16 to receive the data transmission.

Figure 8:
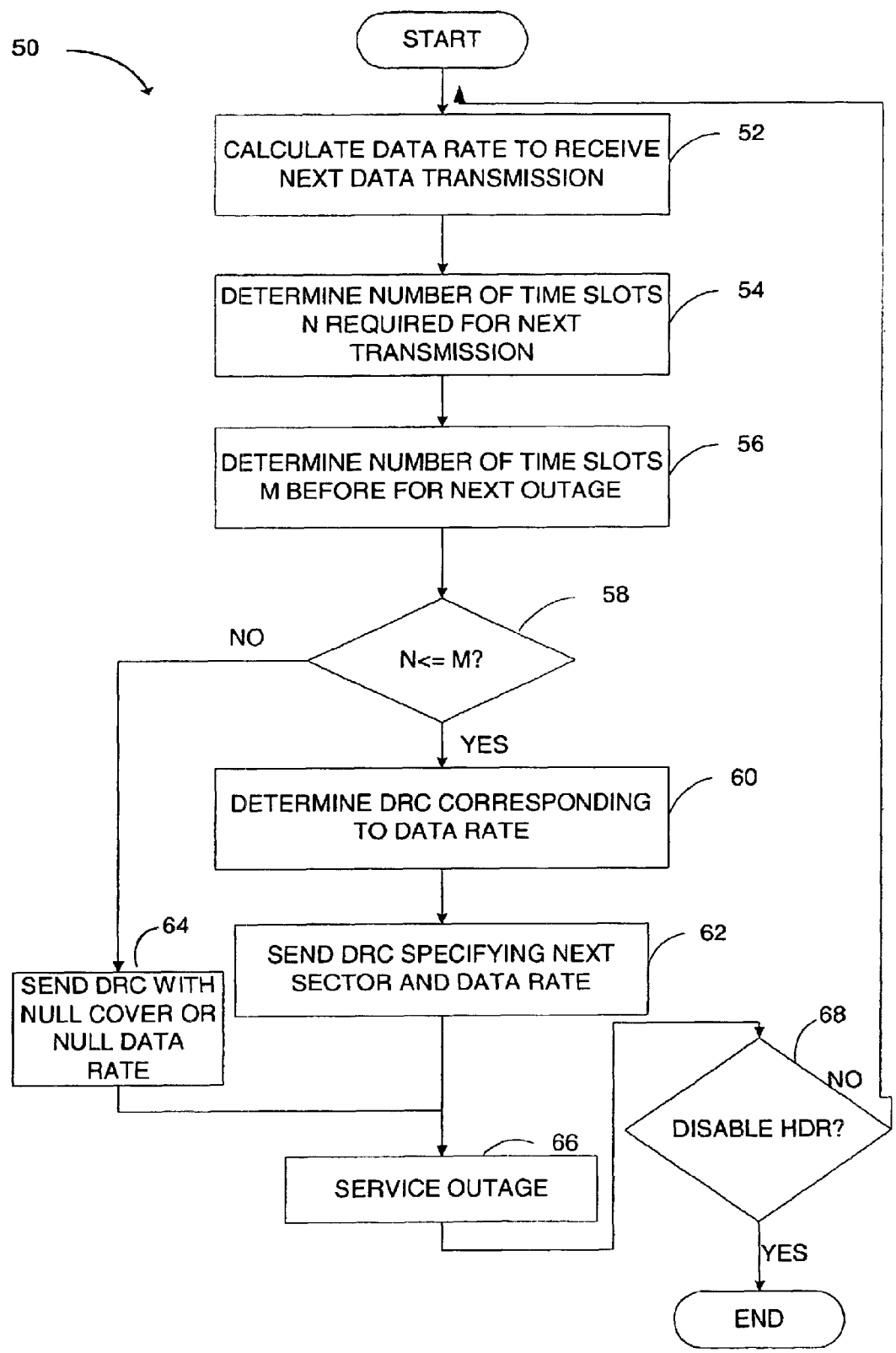
FIG. 8 is a flow diagram of data rate control for a communication system as in FIG. 1 according to one embodiment.

The AT 16 continuously determines a data rate for receipt of data transmissions. The time required to process a data transmission at the data rate is determined and compared to the time available prior to a next outage. The data rate is translated to the corresponding DRC value if there is time available to receive the data transmission. FIG. 8 illustrates a process 50 for generating DRC information in anticipation of an outage according to one embodiment. At step 52 the AT 16 calculates a data rate for receiving a given data transmission. Based on the data rate, the AT 16 calculates the number of time slots N required for to receive the transmission at the calculated data rate of step 52. The AT also calculates the number of time slots M prior to a next outage at step 54. A comparison of N and M is made at decision diamond 56. If N is less than or equal to M, i.e., sufficient time slots are available for the next transmission, processing continues to step 60 to determine the DRC value corresponding to the calculated data rate. The DRC value is sent identifying the data rate and sector at step 62. Processing continues to step 66 to process the outage. If there are insufficient time slots available at decision diamond 58, processing continues to step 64 to send a DRC value having a null data rate or a null cover. At decision diamond 68 the AT 16 determines to continue the data transmission or to terminate the HDR transactions. For example, AT 16 may receive a voice call and terminate the data transmission until completion of the call. If the data transmissions are to continue, processing returns to step 52 to determine a next data rate. If no pages are received, the HDR transactions continue.

The method of FIG. 8 is applicable in a wireless communication system capable of data communications, wherein the access terminal first determines a data service outage and then transmits a data outage indicator to inhibit data transmissions during the outage. Effectively, the access terminal does not request any data transmissions that will not complete prior to the outage. The access terminal continues to provide DRC requests to the access network, wherein if time is not available for receipt of a data transmission, the corresponding DRC specifies a null data rate or a null sector. In response, the access network does not transmit data to the access terminal that will not be completed prior to the outage.

Thus, a novel and improved data rate control has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a Digital Signal Processor (DSP), an Application Specific Integrated Circuit (ASIC), a Field Programmable Gate Array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A mobile wireless apparatus operative in a wireless data communication system, comprising:
    a processor; and
    a memory coupled to the processor, wherein the processor is operative on a plurality of computer readable instructions, comprising:
        a first set of computer readable instructions operative to determine if sufficient time slots are available to receive a data packet prior to a scheduled outage; and
        a second set of computer readable instructions operative to generate an outage indicator to inhibit transmission of the data packet if sufficient time slots are not available, wherein the outage indicator is transmitted from the mobile wireless apparatus via a reverse link.

2. The apparatus of claim 1, wherein the outage indicator is a data rate control null cover.

3. The apparatus of claim 1, wherein the outage indicator is a data rate control having a null data rate.

4. The apparatus of claim 1, wherein the outage indicator is associated with an anticipated outage of data service in the apparatus.

5. The apparatus of claim 4, wherein the anticipated outage is due to a page monitor.

6. The apparatus of claim 4, wherein the anticipated outage is due to a frequency search.

7. An apparatus as in claim 1, further comprising
    a third set of computer readable instructions operative to generate a data rate request for a next transmission if sufficient time slots are available, wherein the data rate request is transmitted from the apparatus via a reverse link.

8. An apparatus as in claim 7, wherein the available time slots prior to a next outage is a function of the data rate request.

9. In a wireless communication system capable of data communications, a method comprising:
    determining a scheduled data service outage; and
    transmitting a data outage indicator to inhibit data transmissions during the outage from a mobile wireless apparatus being operative in the wireless data communication system.

10. The method of claim 9, wherein the data service outage is due to a frequency search.

11. The method of claim 9, wherein the data outage indicator is a data rate control message.

12. The method of claim 11, wherein the data rate control message indicates a null data rate.

13. The method of claim 11, wherein the data rate control message indicates a null sector.

14. The method of claim 9, further comprising:
    determining a time of the data service outage.

15. The method of claim 14, further comprising:
    determining a first time period to receive data transmissions.

16. The method as in claim 9, further comprising:
    determining a first data rate to receive a next transmission;
    determining a first number of time slots N required for the next transmission;
    determining a second number of time slots M before an outage;
    sending a data rate request requesting the next transmission at the first data rate if N is greater than M; and
    sending the data rate request requesting the next transmission at a null data rate if N is not greater than M.

17. The method as in claim 16, further comprising:
    servicing the outage.

18. A wireless apparatus operative in a multi-carrier wireless communication system, comprising:
    time calculation means to determine a scheduled data outage for receipt of data on a first carrier; and
    an outage indication means to inhibit transmission of data on the first carrier during the scheduled data outage.

19. The wireless apparatus of claim 18, further comprising:
    data calculation means to determine if a first data transmission will complete before the data outage.

20. A mobile wireless communication apparatus adapted for wireless data communications, comprising:
   means for determining a scheduled data service outage; and
   means for transmitting a data outage indicator to inhibit data transmissions during the outage from a mobile wireless apparatus being operative in the wireless data communication system when sufficient time slots are not available to receive a data packet prior to the outage.

* * * * *